March 19, 1935.  E. SCHIMANEK  1,995,228
AIRCRAFT CARBURETOR
Filed March 23, 1933  3 Sheets-Sheet 1

E. Schimanek
INVENTOR

By Marks & Clerk
Attys.

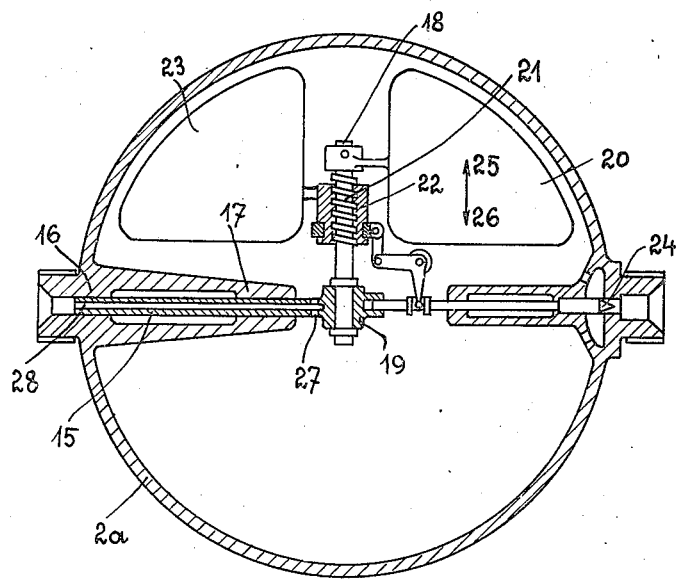
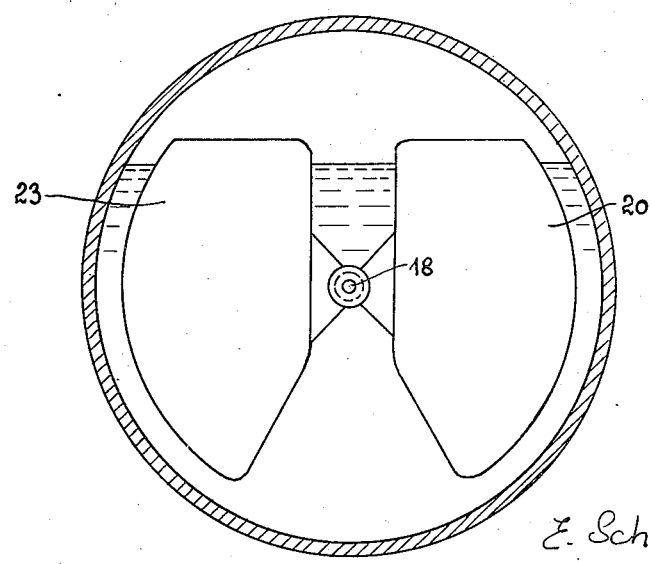

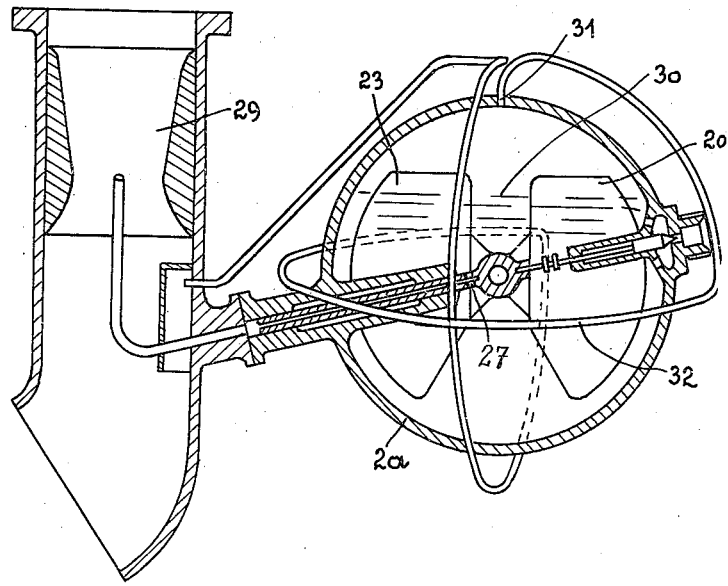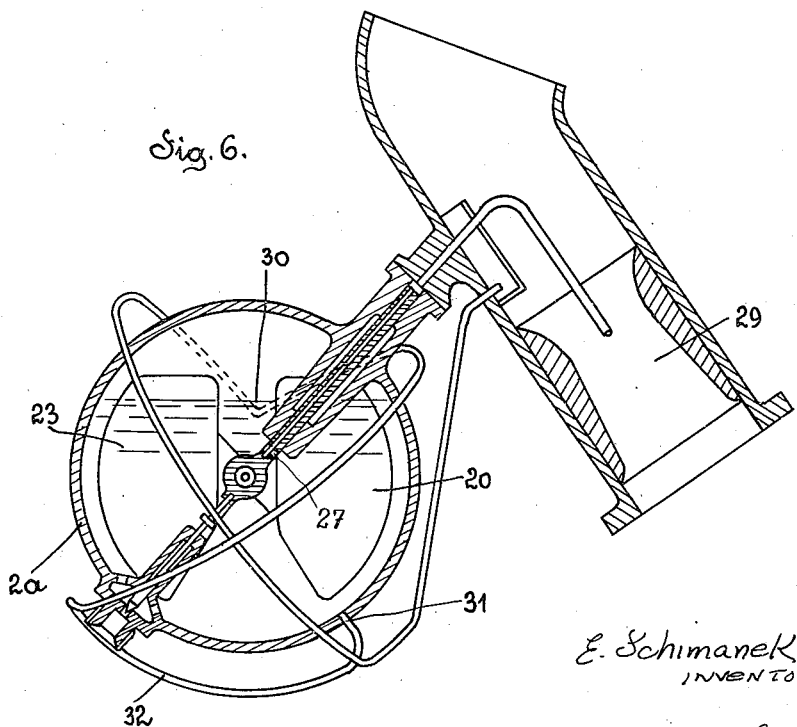

Patented Mar. 19, 1935

1,995,228

UNITED STATES PATENT OFFICE 1,995,228

AIRCRAFT CARBURETOR

Emil Schimanek, Budapest, Hungary, assignor to the firm Société du Carburateur Blériot, Paris, France Application March 23, 1933, Serial No. 662,315
In France January 23, 1933

5 Claims. (Cl. 261—72)

It is known that if an aircraft is flying under sharp angles with regard to the horizontal, a proper feed of the motor by the carburetor becomes difficult owing to the unsteadiness of the level of liquid fuel within the float chamber. This is especially the case with fighting airplanes which have very often to perform numerous acrobatics.

Object of the present invention is a float chamber of constant level, satisfying the ever growing claim of aviation that perfect flying be made possible under any angle and without the intervention of any centrifugal force or the like.

The float chamber according to the invention is characterized by the fact that one or several floats carried by the liquid fuel and one or several pendulum weights, the position of which is the result of forces of inertia (gravitation, centrifugal force etc.) exercised upon them, or at least two floats, are arranged within this chamber and are acting in such way that the needle controlling the inlet of the liquid fuel be regulated by the relative position of the floats and pendulum weights or by the relative position of the two or more floats.

The following description with respect to the accompanying drawings, given as a mere example, will give a good idea of how this invention may be carried out.

Figs. 3 and 4 are analogous sections of a float chamber with two floats.

Figs. 5 and 6 are other similar views showing the connection between float chamber and carburetor, the tube 32 being shown in elevation.

Figure 1:
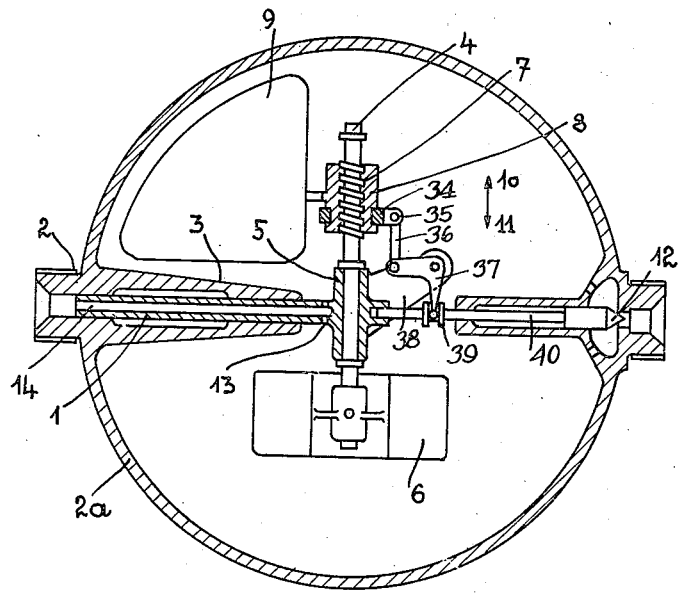
Figs. 1 and 2 are two sections, perpendicular to one another, of a float chamber with one float and one weight.
Figure 2:
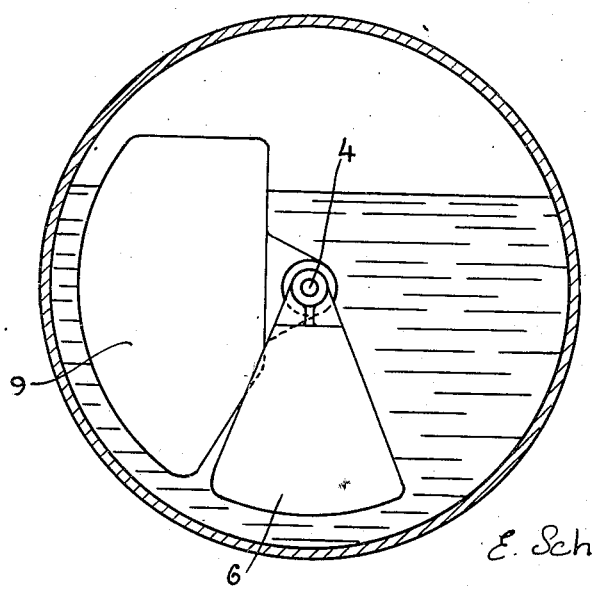

In the float chamber 2ª with constant level shown in Figs. 1 and 2 of spherical shape there is an axle 1 mounted within a support, which may consist of a tubular guide 2, 3, making one body with the chamber. To the axle 1 is fastened a collar 5, which serves as bearing for another axle 4, to which again a weight 6 is mounted like a pendulum.

The axle 4 has threads at 7, and to the latter is fastened a screw-nut 8 joined to the float 9. The screw nut 8 is formed with a recess receiving a ring 34 pivotally connected at 35 with a rod 36 which latter is connected with one arm of a bell crank lever 37 pivotally mounted on a wing-like extension 38 of the collar 5. The other arm of the bell crank lever 37 is engaged in a grooved collar 39 on the stem 40 of the needle 12. Owing to the relative arrangement of axles 1 and 4 the weight 6 is always assuming a position in the direction of the forces of inertia. The forces of inertia also determine the position of the level of liquid fuel, forming always an angle of 90 degrees with the direction of said forces.

Under such circumstances the relative position of float and weight is determined by the height of the level of liquid fuel, whatever the position of the aircraft or vehicle carrying the float chamber may be. If the level is sinking, the screw-nut 8 will get displaced in the direction of arrow 10, thus lifting the needle 12 off its seat. If the level is rising, the screw-nut will be displaced in the direction of arrow 11 and the needle brought nearer to its seat.

The petrol leaves the float chamber through the openings 13 placed next to the centre of the chamber, and through the interior channel 14 of axle 1.

In the other construction shown by Figs. 3 and 4 the axle 15 is mounted within the float chamber 2ª with constant level in a guide 16, 17. The axle 15 is carrying a collar 19, which is the bearing of the axle 18, to which the float 20 is fastened.

Axle 18 is fitted in 21 with threads, whereupon screw-nut 22 is fastened; this screw-nut is joined to the float 23.

The way the axles 15 and 18 are mounted always lets the floats 20 and 23 follow the displacements of the level of liquid fuel, whatever they may be. The position of needle 24 will be governed by the relative positions of both the floats. If the level is sinking, the screw-nut 22 gets displaced in direction of arrow 25 and the needle 24 will be removed from its seat.

The petrol leaves the float chamber through the openings 27 placed next to the centre of this chamber, and through the interior channel 28 of axle 15.

Fig. 5 shows the float chamber 2ª with constant level and the carburetor 29 in a position according to the horizontal position of the machine carrying these parts, whereas Fig. 6 is showing them in a position when the machine is turned upside down.

In case of the latter position of machine the floats 20 and 23 are maintaining the same relative position with respect to the level 30 of the liquid as in the normal position shown by Fig. 5.

The ventilation of the float chamber, i. e. the exposure of the liquid to the air-pressure, may take place through one or several holes pierced through any part of the chamber. This or these holes are connected to the air-channel of the carburetor by means of one or several tubes arranged in such way, that one part of this or these tubes may always be situated above the level of the liquid, whatever position the machine may assume.

There is no reason of fearing siphon-action in case of positions of the machine favorable to this phenomenon, since the pressure exercised upon the hole or holes of the tube or tubes will prevent this.

Figs. 5 and 6 show as an example a construction where the ventilation hole 31 communicates with the air-channel by means of tube 32, which forms approximately two great circles perpendicular to each other and disposed around the float-chamber.

Needless to say, certain details of alteration might be applied to the above described float chamber without trespassing the limits of the present invention.

What I claim is:

1. In a feeding arrangement for liquids, more particularly for fuel in which the level of the liquid is maintained at a constant height, a float chamber having a fluid inlet, a member controlling the flow of fluid through said inlet, a device acting in response to variations in the level of the fluid in said chamber to adjust the fluid control member, said device including members actuated in response to natural forces and mounted to turn about two axes substantially perpendicular to each other, at least one of the last mentioned members being constituted by a float, and means acting in connection with the last mentioned members to prevent displacement of the fluid control member upon movement of said members as a unit within said chamber.

2. In a feeding arrangement for liquids, more particularly for fuel in which the level of the liquid is maintained at a constant height, a float chamber having a fluid inlet, a member controlling the flow of fluid through said inlet, a device acting in response to variations in the level of the fluid in said chamber to adjust the fluid control member, said device including members actuated in response to natural forces and mounted to turn about two axes substantially perpendicular to each other, at least one of the last mentioned members being constituted by a float, means acting in connection with the last mentioned members to prevent displacement of the fluid control member upon movement of said members as a unit within said chamber, the interior of said chamber being of spherical form.

3. In a feeding arrangement for liquids, more particularly for fuel in which the level of the liquid is maintained at a constant height, a float chamber having a fluid inlet, a member controlling the flow of fluid through said inlet, a device acting in response to variations in the level of the fluid in said chamber to adjust the fluid control member, said device including members actuated in response to natural forces and mounted to turn about two axes substantially perpendicular to each other, at least one of the last mentioned members being constituted by a float, means acting in connection with the last mentioned members to prevent displacement of the fluid control member upon movement of said members as a unit within said chamber, and an outlet for the fluid arranged substantially at the center of the chamber.

4. In a feeding arrangement for liquids, more particularly for fuel in which the level of the liquid is maintained at a constant height, a float chamber having a fluid inlet, a member controlling the flow of fluid through said inlet, a device acting in response to variations in the level of the fluid in said chamber to adjust the fluid control member, said device including members actuated in response to natural forces and mounted to turn about two axes substantially perpendicular to each other, at least one of the last mentioned members being constituted by a float, and means acting in connection with the last mentioned members to prevent displacement of the fluid control member upon movement of said members as a unit within said chamber, said last mentioned means including relatively movable parts carried respectively by the last mentioned members and adapted upon relative displacement to effect adjustment of the fluid control member.

5. In a feeding arrangement for liquids, more particularly for fuel in which the level of the liquid is maintained at a constant height, a float chamber having a fluid inlet, a member controlling the flow of fluid through said inlet, a device acting in response to variations in the level of the fluid in said chamber to adjust the fluid control member, said device including members actuated in response to natural forces and mounted to turn about two axes, substantially perpendicular to each other, at least one of the last mentioned members being constituted by a float, means acting in connection with the last mentioned members to prevent displacement of the fluid control member upon movement of said members as a unit within said chamber, and means for ventilating the chamber, said means being constituted by tubes following such a course that some portion thereof is always above the surface of the level of the liquid in said chamber.

EMIL SCHIMANEK.